No. 845,259. PATENTED FEB. 26, 1907.
L. G. QUACKENBOSS.
BAY WINDOW.
APPLICATION FILED DEC. 22, 1904.

Witnesses:
G. V. Dowarus.
M. Perry Hahn.

Inventor:
Leonard G. Quackenboss,
by Jones & Addington
Attorneys.

No. 845,259.

PATENTED FEB. 26, 1907.

L. G. QUACKENBOSS.
BAY WINDOW.
APPLICATION FILED DEC. 22, 1904.

Witnesses:
G. V. Dinwarus
W. Perry Hahn

Inventor:
Leonard G. Quackenboss
by Jones & Addington
Attorneys

No. 845,259. PATENTED FEB. 26, 1907.
L. G. QUACKENBOSS.
BAY WINDOW.
APPLICATION FILED DEC. 22, 1904.

Witnesses:
Inventor
Leonard G. Quackenboss
by Jones & Addington
Attorneys

No. 845,259. PATENTED FEB. 26, 1907.
L. G. QUACKENBOSS.
BAY WINDOW.
APPLICATION FILED DEC. 22, 1904.

No. 845,259. PATENTED FEB. 26, 1907.
L. G. QUACKENBOSS.
BAY WINDOW.
APPLICATION FILED DEC. 22, 1904.

No. 845,259. PATENTED FEB. 26, 1907.
L. G. QUACKENBOSS.
BAY WINDOW.
APPLICATION FILED DEC. 22, 1904.

Witnesses:
G. V. Domarus.
N. Perry Hahn

Inventor:
Leonard G. Quackenboss
by Jones & Addington
Attorneys:

No. 845,259. PATENTED FEB. 26, 1907.
L. G. QUACKENBOSS.
BAY WINDOW.
APPLICATION FILED DEC. 22, 1904.

UNITED STATES PATENT OFFICE.

LEONARD G. QUACKENBOSS, OF CHICAGO, ILLINOIS.

BAY-WINDOW.

No. 845,259.  Specification of Letters Patent.  Patented Feb. 26, 1907.

Application filed December 22, 1904. Serial No. 238,031.

*To all whom it may concern:*

Be it known that I, LEONARD G. QUACKENBOSS, a citizen of the United States, residing at Chicago, in the county of Cook and State of Illinois, have invented new and useful Improvements in Bay-Windows, of which the following is a full, clear, concise, and exact description, reference being had to the accompanying drawings, forming a part of this specification.

My invention relates to detachable structures adapted to be attached to an ordinary window or to any other position where desired for the purpose of displaying merchandise, for the reception of flowers, &c., my object being to provide a structure of this character to which ready access may be obtained.

A further object of my invention is to provide a structure of this character whereby the different portions of the same may be swung within convenient reach of a person standing within the room, so that the same may be readily cleaned.

A still further object of my invention is to provide a structure which, while being detachable, forms when placed in position a weatherproof connection and permits the same to be used with an open window without materially affecting the temperature of the room.

In the accompanying drawings I have shown the preferred manner of constructing my invention, and in said drawings

Figure 1:
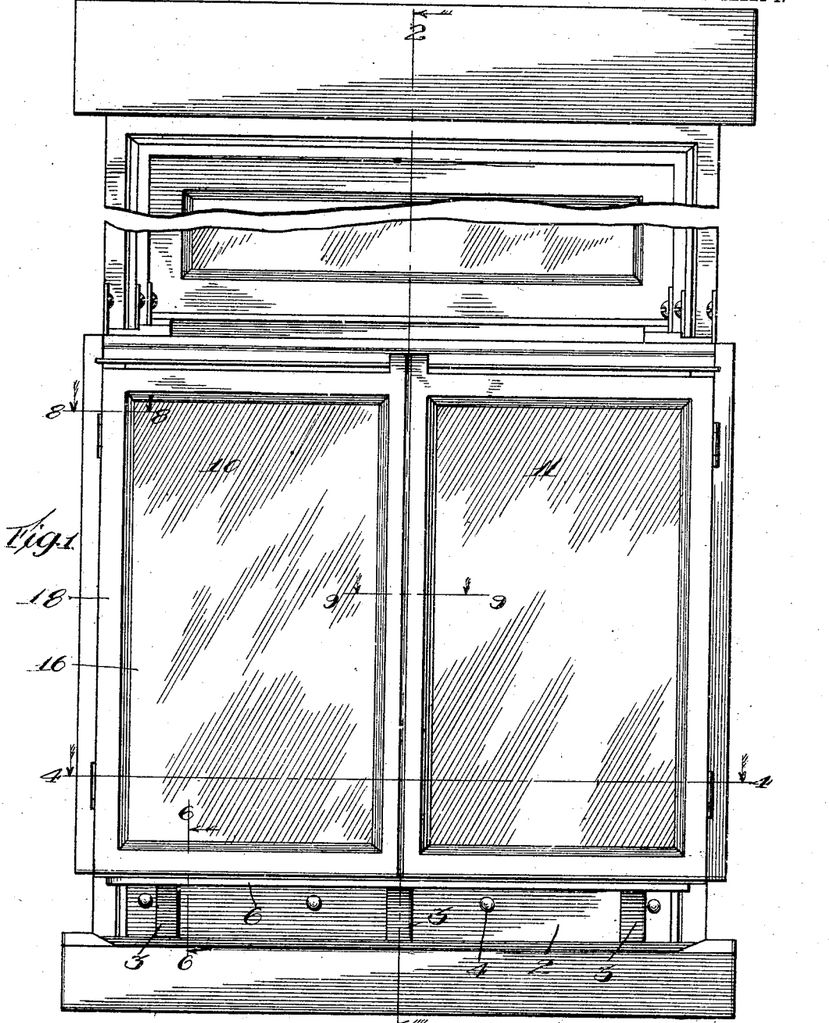
Figure 1 is a front elevation of my device.
Figures 2, 3:
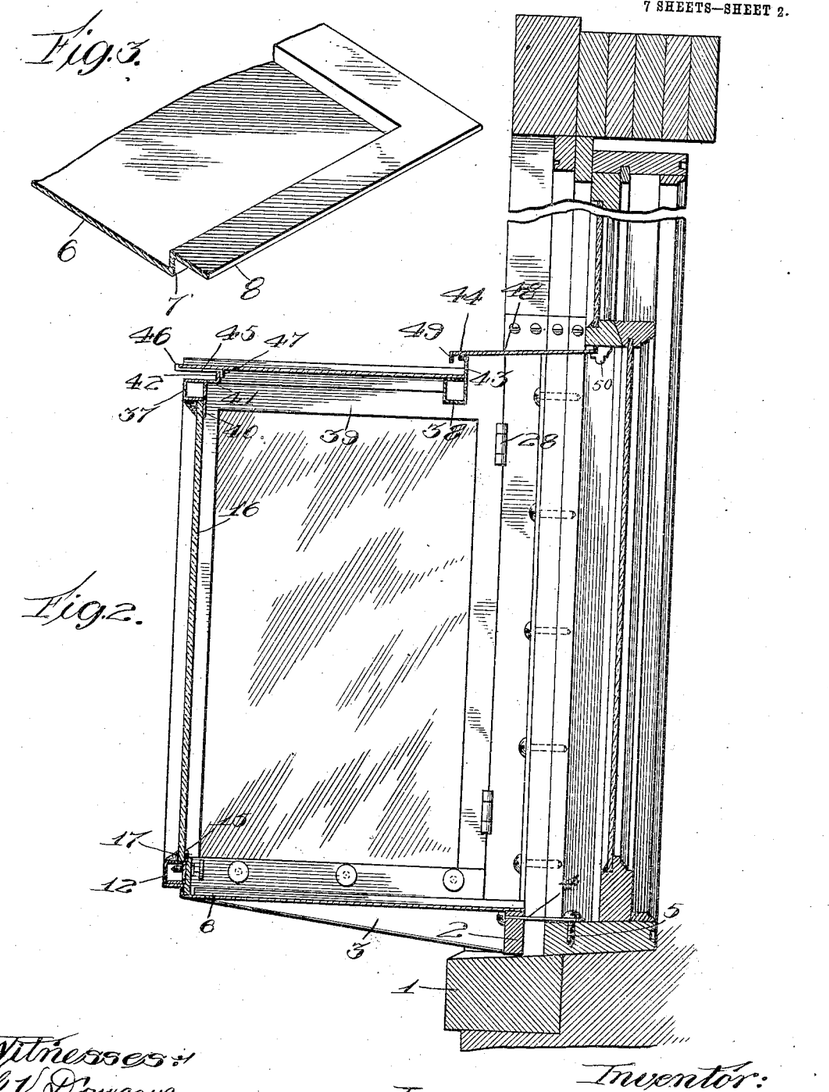
Fig. 2 is a longitudinal section thereof, taken on the line 2 2 of Fig. 1.
Fig. 3 is a detail of the bottom platform upon which my invention rests.
Figure 4:
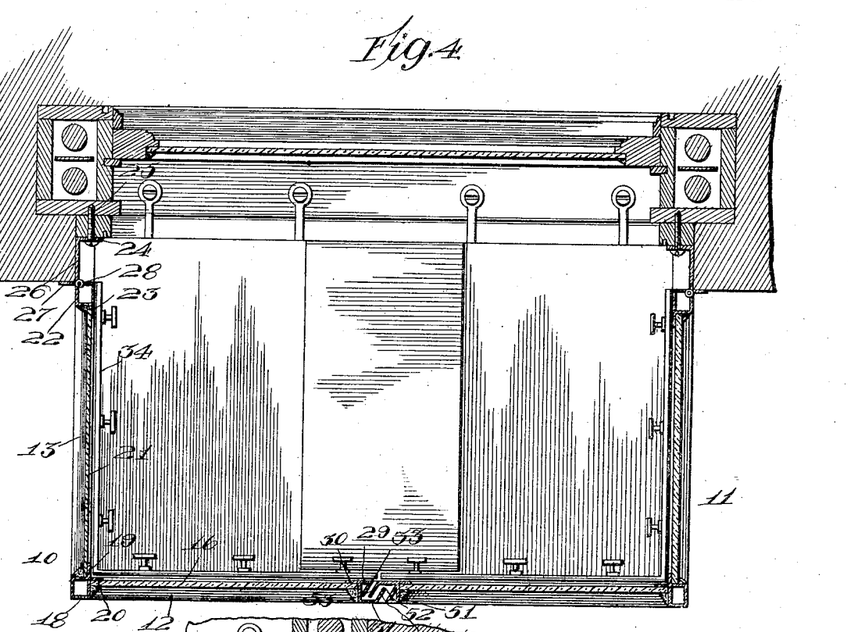
Fig. 4 is a transverse section of my invention on the line 4 4 of Fig. 1.
Figures 6, 7, 8, 9, 10:
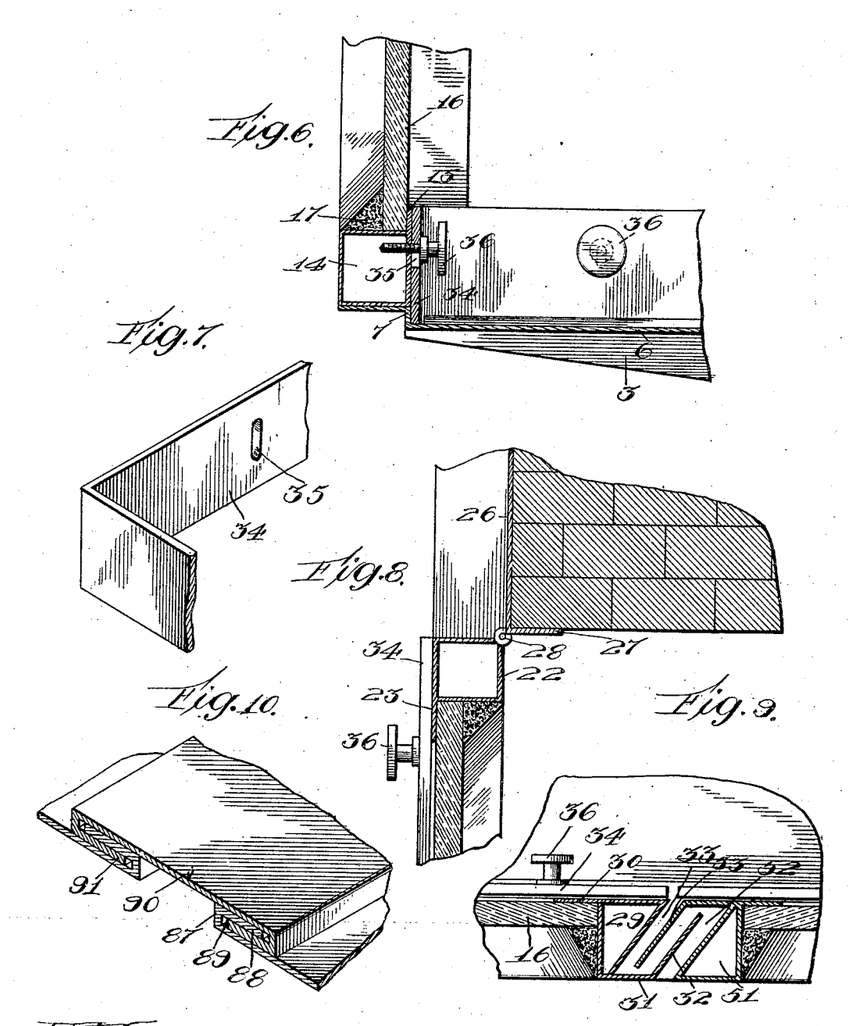
Fig. 6 is a detail section taken on the line 6 6 of Fig. 1.
Fig. 7 is a detail of my weather-stripping connection between the frames and the bottom.
Fig. 8 is a detail section taken on the line 8 8 of Fig. 1.
Fig. 9 is a detailed section taken on the line 9 9 of Fig. 1.
Fig. 10 is a detail showing my means for locking the two sections of the bottom of my modification.

My device, as here shown, generally speaking, comprises two sections, which are adapted to be connected together to form a bay, said sections being hung within the opening in such a manner that they may be independently swung for cleaning and other purposes. In the preferred construction of my device I preferably mount at the lower portion of the opening a cross-piece 2, having outwardly-projecting bracket-arms 3 at intervals. The cross-piece is preferably secured to the frame of the window by connecting-bolts 4, which pass through the cross-piece and have at their inner ends eyes, through which screws 5 are passed and secured to the lower sill of the window-frame. Supported upon the brackets 3 is a bottom 6, preferably formed of sheet metal and stamped, as shown in Fig. 3, having extending from the sides 7 thereof outwardly-extending flanges 8. The body portion of my device comprises two sections 10 and 11, each, as here shown, having a front and side frame. The side frames are here pivoted at their inner ends to the window-frame. Each section is formed with a front bottom rail 12 and a side bottom rail 13, which are constructed substantially as shown in Fig. 6 and comprise, as here shown, the hollow square rail portion 14, having an upwardly-extending flange 15. Upon the upper side of the rail and against the flange rests the lower edge of a panel 16, which is held in position by putty or other fastening means 17. A vertical upright post 18, as here shown, extends from the point where the side and front rails join and comprises in this case a hollow squared post having an inwardly-projecting flange 19 and a transversely-extending flange 20. These flanges, as shown, form supports against which the side edges of the panels 16 and 21 are adapted to rest, putty or other fastening means being used for holding the same in position. A second vertically-arranged post 22 is connected to the inner end of the side rail and is hinged to the frame of the window. This vertical post, as here shown, comprises a hollow metallic post having an outwardly-extending flange 23, against which the inner edge of the panel 21 is adapted to rest and be secured in position by putty or other means.

A fastening-strip comprising the supporting portion 24 and secured by means of screws 25 to the frame of the window and an outwardly-extending portion 26, having its outer end 27 turned back and engaging over the outer side of the wall in which the window-frame is secured, is provided, to which the post 22 is secured in this case by hinges 28. A third vertical post 29 is secured to the outer end of the bottom cross-rail 12 and comprises a post having a flange 30 formed thereon, against which is adapted to rest one edge of the panel 16, putty or other fastening means being used for holding the panel in its place. A flange 31, formed on the outer side of the post and extending in the opposite direction, has an inturned portion 32, which with one side of the post 29 forms a channel 33 for the purpose hereinafter described. As here shown, secured to the bottom rails and extending around the two sides of each frame is a weather-strip 34, having formed therein elongated slots 35, through which are adapted to pass screws 36, said screws being arranged to be fastened to the inner side wall of the bottom rails 12 and 13 and hold the weather-strip in any position desired. The lower end of this weather-strip rests against the sides 7 of the bottom plate to make a weather-tight joint between the lower rails of the section and the bottom. Top side rails 37 and 38 and an end rail 39 are connected to the upright posts 22, 18, and 29. The side rail 37 in this case comprises a hollow squared rail having a downwardly-extending flange 40, against which the upper edge of the front panel 16 is adapted to rest, putty or other means being used for holding the panel in position. The rail 37, as here shown, also has an inwardly-extending top flange 41, which is provided with an upwardly-extending flange 42. The side rail 38 in this case is provided with an upwardly-extending flange 43, having an outturned portion 44, and the end rail 39 is of the same construction as the side rail 37. A top panel is laid upon the top rails, and in this case is secured at its outer end by fastening-clips 45, which are arranged at intervals along the front and end rails. These clips are adapted to rest under the top and have at their outer ends upturned portions 46 and at their inner ends downturned portions 47, the downturned portion 47 being adapted to engage over the flange 42 of the side rail, while the outer portion 46 engages the outer edge of the top, thereby preventing the same from slipping out of position.

As here shown, extending between the meeting-rail of the window and the top rail 38 is a flashing-strip 48, which has a downturned portion 49, adapted to engage over the flange 43 and is shown as supported upon a depending shelf 50, formed upon the under side of the window-sash, as shown. This flashing-strip effectually prevents the weather from entering the space between the inner rail 38 and the window and forms an effectual joint therebetween.

The section 11 is constructed in the same general manner as the section 10, with the exception that the vertical support 51 is reversed in order that the channel 52, formed therein, will receive the portion 32 of the vertical support 29, and the extended portion 53 will fit into the channel 33, as shown. By this arrangement, as here shown, a weather-tight joint is made between these two vertical portions and the elements are effectually excluded thereby.

Figure 5:
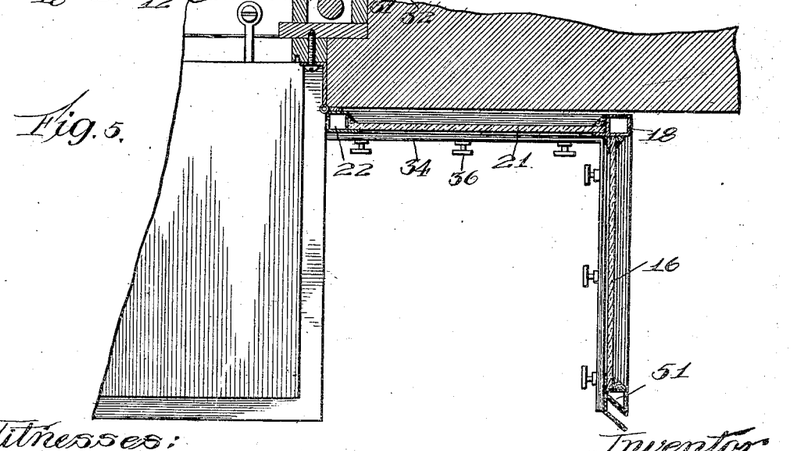
Fig. 5 is a transverse section showing one of the portions of my device swung outwardly.

It will be noted that the sections as formed being pivoted are readily adapted to be swung inwardly for the purpose of cleaning. When it is desired to swing the section in, of course the bottom weather-strip 34 would necessarily have to be raised in order that it may clear the sides of the bottom. Each section may be swung in independently of the other section and may be also swung back against the sides of the building, as shown in Fig. 5.

In Figs. 10 to 20 I have shown a modification of my invention in which the sections are not only pivoted to swing inwardly in the opening they are adapted to cover, but are also adapted to be moved laterally along the sides of the wall.

Figures 11, 12, 13:
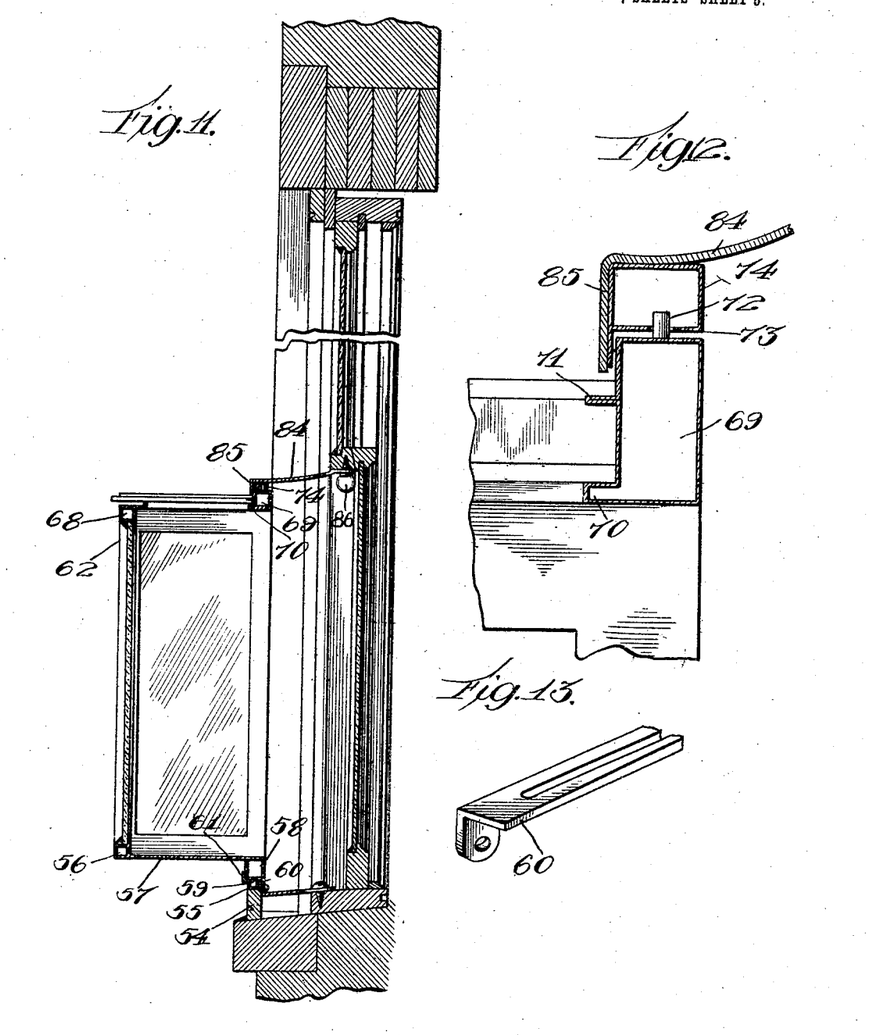
Fig. 11 is a transverse section of a modification of my device.
Fig. 12 is a longitudinal section taken on the line 12 12 of Fig. 17.
Fig. 13 is a detail of the bottom rail upon which the two sections are supported.
Figure 17:
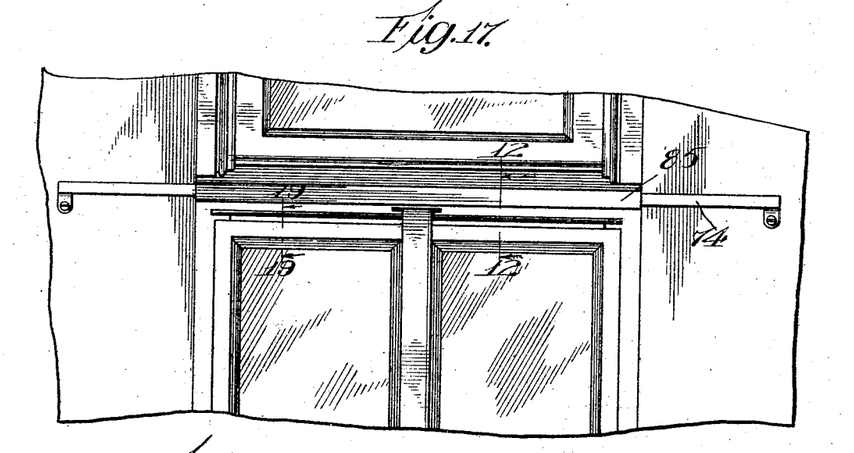
Fig. 17 is a partial front elevation of my modification.
Figures 18, 19:
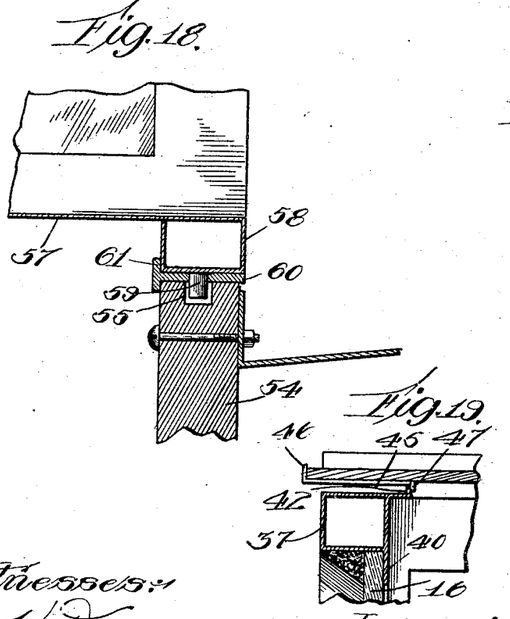
Fig. 18 is a detailed section of my bottom supporting-rail for the movable sections of my bay.
Fig. 19 is a section taken on the line 19 19 of Fig. 17.
Figure 20:
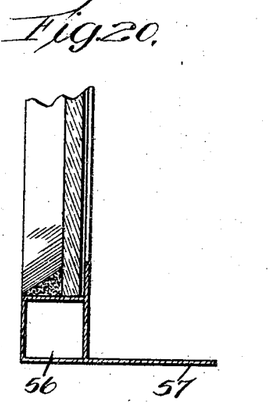
Fig. 20 is a detailed section of the bottom of my modification.

In constructing my invention for this purpose, as here shown, at the lower portion of the opening is arranged a cross-rail 54, which extends beyond the width of the opening and has formed therein a groove 55. The bottom outer cross-rails 56, as here shown, are formed substantially the same as are the bottom outer cross-rails 12 in my preferred structure, with the exception that extending inwardly from said rails is the bottom 57, which connects with the inner cross-rails 58. These rails in this case are formed of sheet metal bent square in cross-section and have formed integrally therewith the bottom portion 57, as shown in Fig. 18. The bottom inner rails are provided in this case at their outer ends with downwardly-projecting pins 59, which extend into the channel 55, a metallic shoe or protecting-strip 60 being interposed between the bottom rail of the sections and the supporting cross-piece. This shoe is provided with an upturned flange 61, which serves as a guide for the bottom rail 58 when the sections are slid along, while the pin operating in the groove permits the sections to be swung inwardly, as shown in dotted lines in Fig. 14. The corner-uprights 62 and 63 are formed in this case as are the corner-uprights 18 in my preferred structure, as are also the inner uprights 64 and 65, formed substantially the same as the uprights 22 in my preferred form, with the exception that the uprights 64 and 65 have formed therein channels or grooves 66, into which are adapted to fit the ends of a hinged closure-frame 67. The hinged closure-frame 67 is here shown as secured to the side of the wall, and when the sections are in a closed position the hinged closure-frame 67 will engage in the notches 66 and prevent the same from moving upon the supporting-rails. The top outer cross-pieces 68 are here shown of the same structure as the top outer cross-pieces 37 in my preferred construction. The inner cross-pieces 69, however, are in this case formed as shown in Fig. 12, being constructed of sheet metal bent to form a substantially rectangular cross-piece, having a flange 70 formed at their lower and inner edge, upon which the inner edge of the top plate or panel is adapted to rest. A projecting flange 71 is also formed upon the cross-piece 69, and between the flange 71 and the glass putty or other suitable retaining means is adapted to be placed. At the outer end of the cross-piece 69 of each section in this case is formed a pivot 72, which is adapted to slide in a channel 73, formed in the top track 74, the top track in this case being secured to the walls of the building, as shown in Fig. 17. The two central uprights of my modifications are formed somewhat different from the two central uprights 31 and 53 of my preferred form. In Fig. 15 is illustrated more particularly the construction of these uprights. One of the same comprises a substantially rectangular upright 75, which is provided with a flange 76, against which the front glass or panel 77 is adapted to rest. The outer edges of this upright may be beveled, as at 78. The upright 79 on the opposite section is provided with a flange 80, against which the front panel 81 is adapted to rest and be held in position by putty or other fastening means, and also has the two side pieces 82 and 83, which form between the same a channel into which the upright 75 is adapted to fit, forming a tight joint between the sections when the same are slid together.

In order that the space between the top track and the lower portion of the upper sash may be closed, a flashing-strip 84 is provided, which has a downwardly-extending flange 85, adapted to fit over the top track 74, and at its inner end is secured to the under side of the lower portion of the top sash by means of thumb-screws 86.

Figure 14:
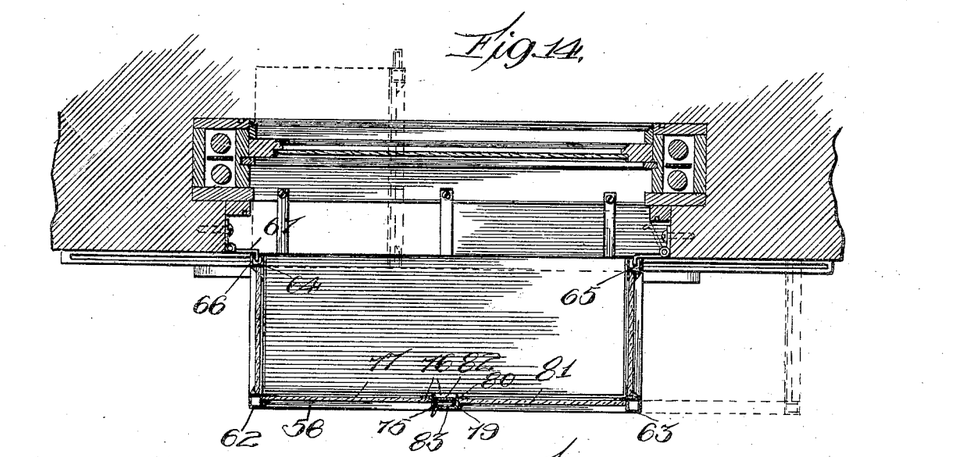
Fig. 14 is a transverse section of my modification.
Figure 15:
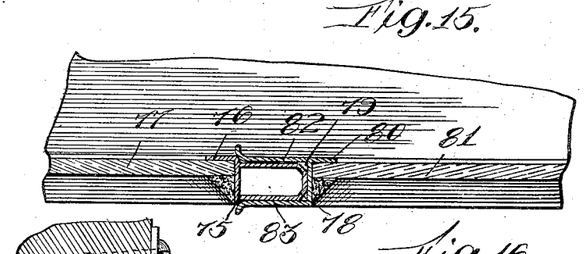
Fig. 15 is a detailed transverse section showing my improved means for locking the two sides together.
Figure 16:
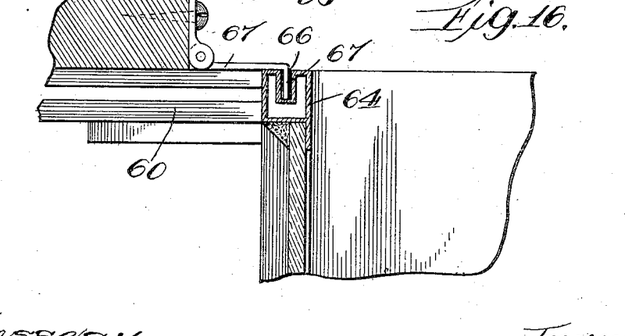
Fig. 16 is a detailed section showing my improved means for holding the two sections in a closed position.

It will be noted that by providing the pivot-pins 72 and 59, which are adapted to run in channels formed in the top and bottom tracks, as shown, the sections may be slid along the sides of the walls and be thus removed from obstructing the opening, or if desired to clean the glass panels of the sections the same may be swung into the room, as shown in dotted lines in Fig. 14, and ready access may be obtained to the sections in this manner.

For the purpose of forming an available platform-space between the sections when the sections are partly open or extended upon the tracks I provide an auxiliary platform, as indicated in Fig. 10. The sections may be partially opened while this auxiliary bottom is in place; but when it is desirable to entirely open the same the auxiliary bottom may be removed. As here shown, the meeting edges of the bottom of each section have in this case the upwardly-turned portions 87 and the backwardly-turned portions 88, forming a channel 89, and, as here shown, the auxiliary platform 90 is provided with an inturned flange 91, adapted to slide into the channel 89.

While I have described one manner of constructing my device, I do not wish to be limited to the particular construction here shown and described, as it is evident my invention admits of various modifications without departing from the spirit thereof.

Having thus described my invention, what I claim as new, and desire to secure by Letters Patent, is—

1. In a bay, a frame formed of sections arranged to form a close casing, each section having suitable panels supported thereon and forming a rigid structure having a side and front portion, said side portion being hingedly secured to the building.

2. In a bay, in combination, a frame formed of sections, each section forming a rigid structure having a side and front portion, the side portions being hingedly secured to the building, suitable panels supported within said frame, and means for interlocking the sections at their juncture to form a weatherproof joint.

3. In a bay, in combination, a frame formed of sections, each section forming a rigid structure having a side and front portion, said side portion being hingedly secured to the building, suitable panels supported within said frame, and a bottom portion having outwardly-extending flanges from the sides thereof, for said sections.

4. In a bay, in combination, a platform having outwardly-extending flanges from the sides thereof, a frame formed of sections, each section forming a rigid structure having a side and front portion, said side portions being hingedly secured to the building, and panels supported within said frame.

5. In a bay, in combination, a frame formed of sections, each section forming a rigid structure, having a side and front portion, and being adapted to interlock each other at their juncture, said side portions being hingedly secured to the building.

6. In a bay, in combination, a platform, a frame formed of sections, each section forming a rigid structure having a side and front portion, said side portions being hingedly secured to the building, panels supported within said frame, and means for interlocking said frame with said platform.

7. In a bay, the combination with a platform, of a frame formed of sections, at least two of said sections being pivotally mounted in an opening above said platform, said sections being adapted to interlock at their juncture, whereby a weatherproof joint is made, and means for interlocking said frame with said platform.

8. In a bay, the combination with a platform, of a frame made in sections, at least two of said sections being pivotally mounted in front of an opening above said platform, and a vertically-movable weather-strip for closing the joint between said sections and said platform when said sections are in the closed position.

9. In a bay, in combination, a frame formed of sections, each section forming a rigid structure having a side and front portion, suitable panels supported within said frame, and a flashing-strip adapted to be secured between the meeting-rail of the window-sash and the inner portion of said frame.

10. In a bay, the combination with fastening-strips secured to the vertical sides of the opening into a building, of a frame formed of sections, each section forming a rigid structure having a side and front portion, said side portions being hingedly secured to said fastening-strips.

11. In a bay, in combination, a skeleton frame formed of sections, each section forming a rigid structure having a side and front portion consisting of hollow, metallic top and bottom rails joined to hollow metallic posts, the posts at the juncture of the sections having grooved flanges adapted to receive the outer wall of the grooved flange of the adjoining section, said rails and posts being provided with flanges to which panels may be secured.

12. In a bay, in combination, a platform, a frame formed of sections, at least two of said sections being pivotally mounted in an opening above said platform, said sections being adapted to interlock at their juncture, means for interlocking said frame with said platform, and for closing the joint between said sections and said platform when said sections are in the closed position.

13. In a bay, in combination, a frame formed of sections, each sections forming a rigid structure having a side and front portion, said side portions being hingedly secured to the building, means for interlocking the sections at their juncture, flanges on said frame, suitable panels supported on said frame and fastened to the flanges by suitable means, means for locking the sections in a closed position, and a flashing-strip secured between the inner portion of the frame and the window-sash.

14. In a bay, the combination with fastening-strips secured to the vertical walls of an opening into a building, of a frame formed of sections, each section forming a rigid structure having a side and a front portion, the side portions being hinged to said fastening-strips, means for interlocking the sections at their juncture, flanges on said frame, suitable panels supported on said frame and fastened to the flanges by suitable means, means for locking the sections in a closed position, a flashing-strip secured between the inner portion of the frame and the window-sash, and a bottom having flanges extending outwardly from the sides thereof.

In witness whereof I have hereunto subscribed my name in the presence of two witnesses.

LEONARD G. QUACKENBOSS.

Witnesses:
M. R. ROCHFORD,
W. PERRY HAHN.